Figure 7:
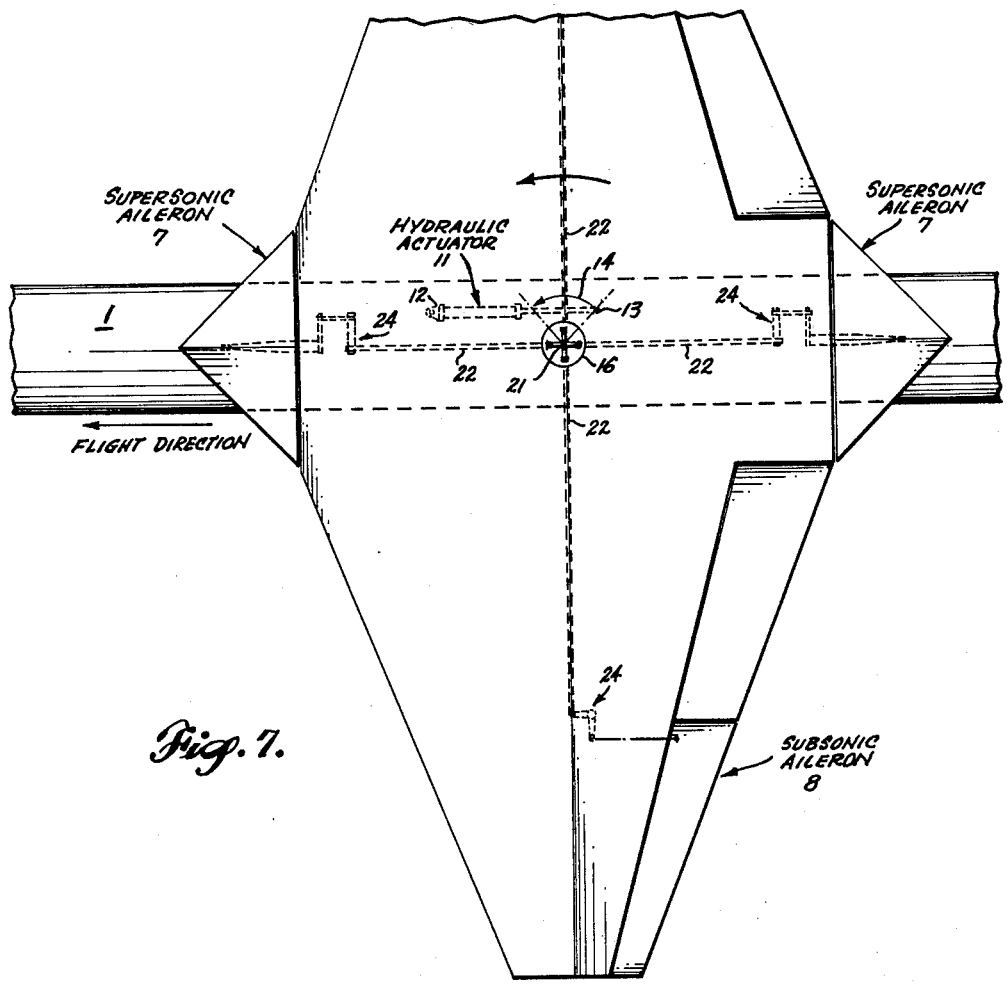

Nov. 3, 1964 R. VOGT 3,155,344
TWO POSITION VARIABLE SHAPED WING
Filed April 10, 1963 7 Sheets-Sheet 1
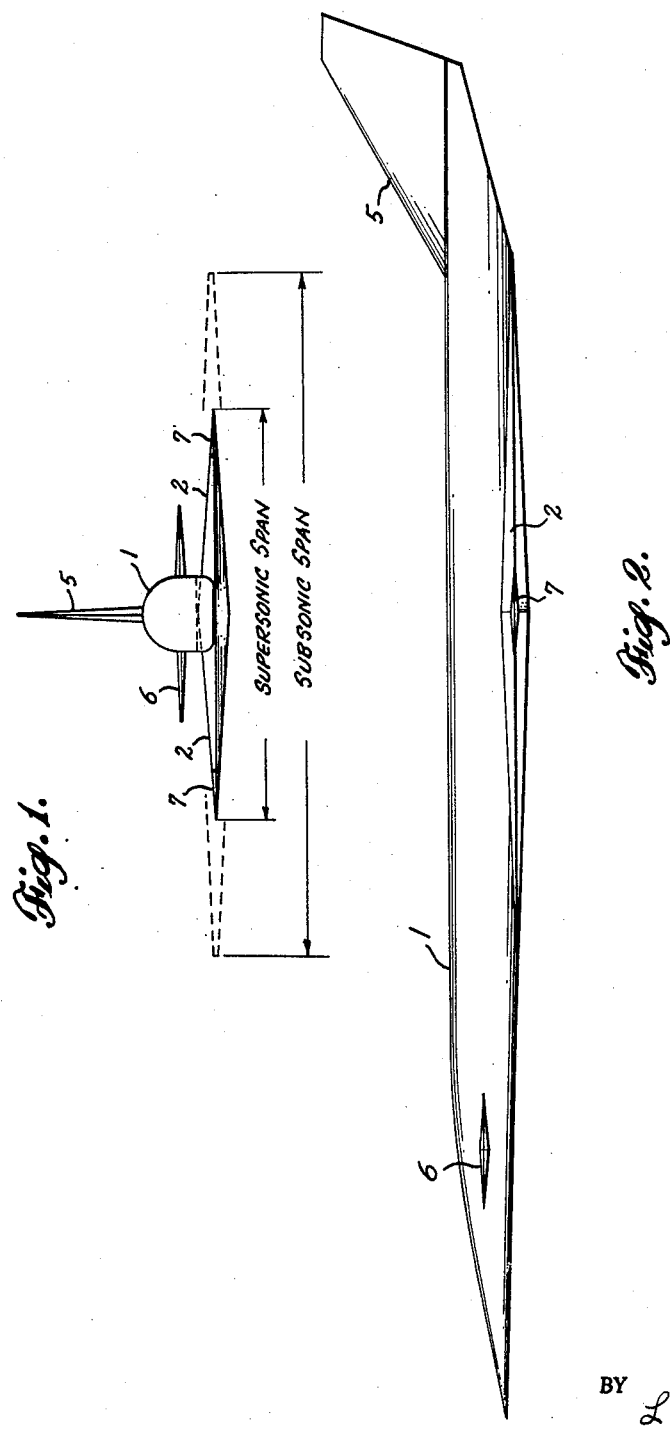
INVENTOR.
RICHARD VOGT
BY L.E. Carnahan
AGENT

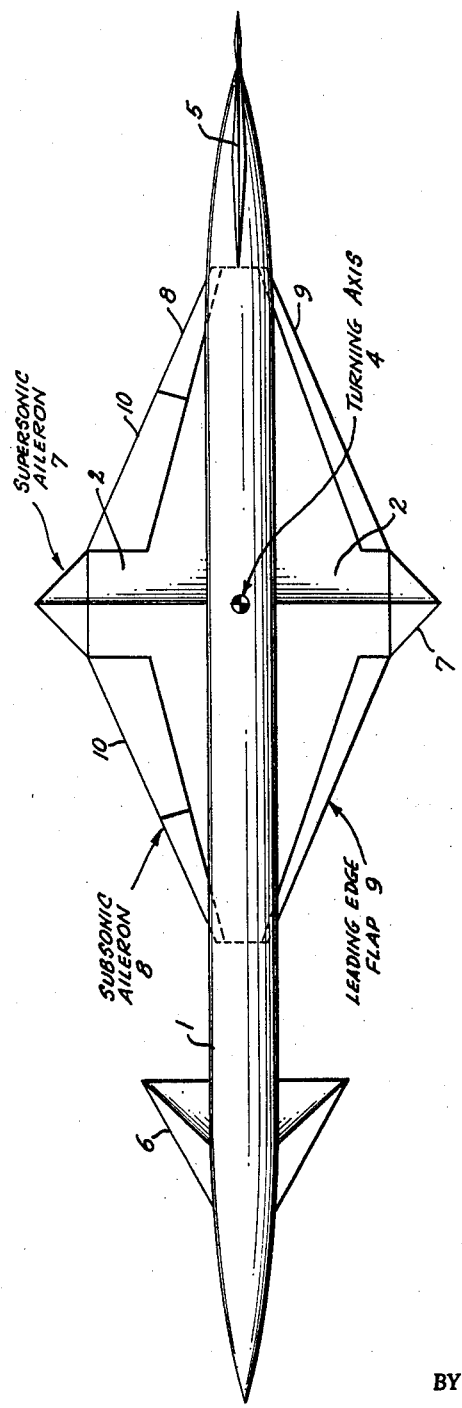

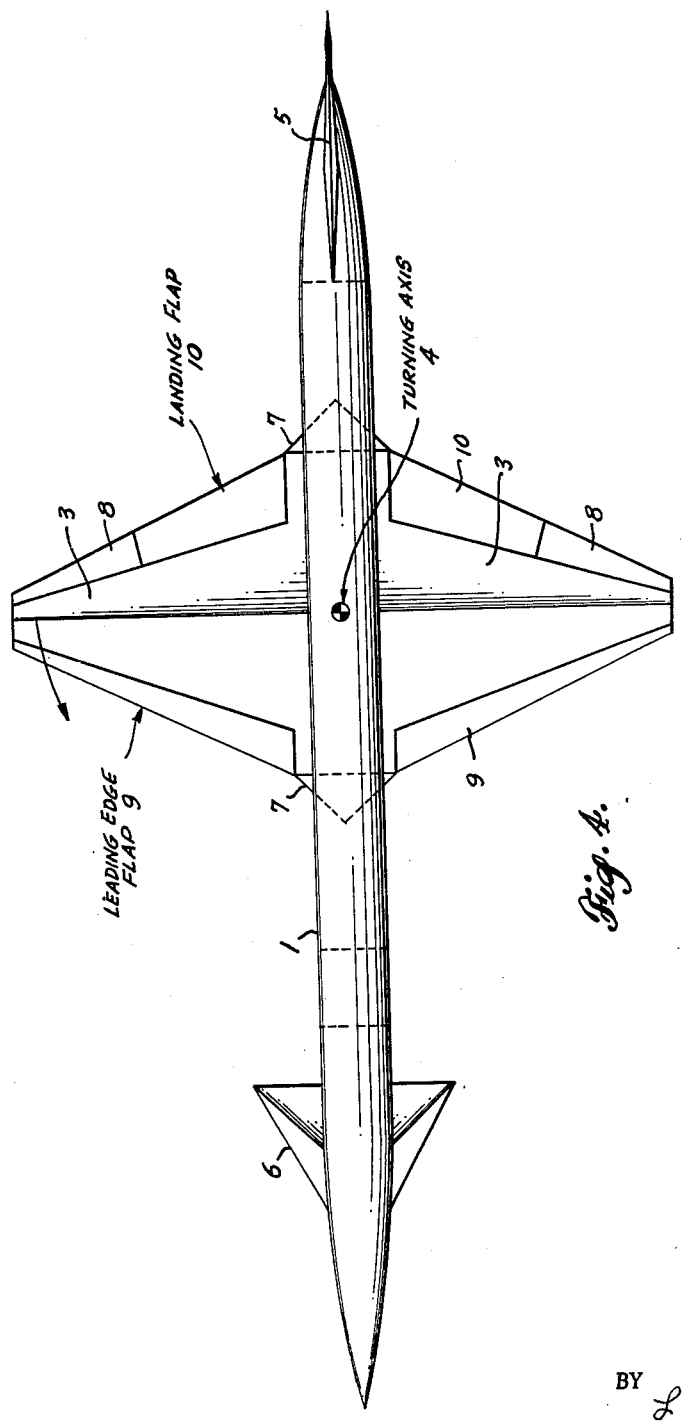

Nov. 3, 1964 R. VOGT 3,155,344
TWO POSITION VARIABLE SHAPED WING
Filed April 10, 1963 7 Sheets-Sheet 4
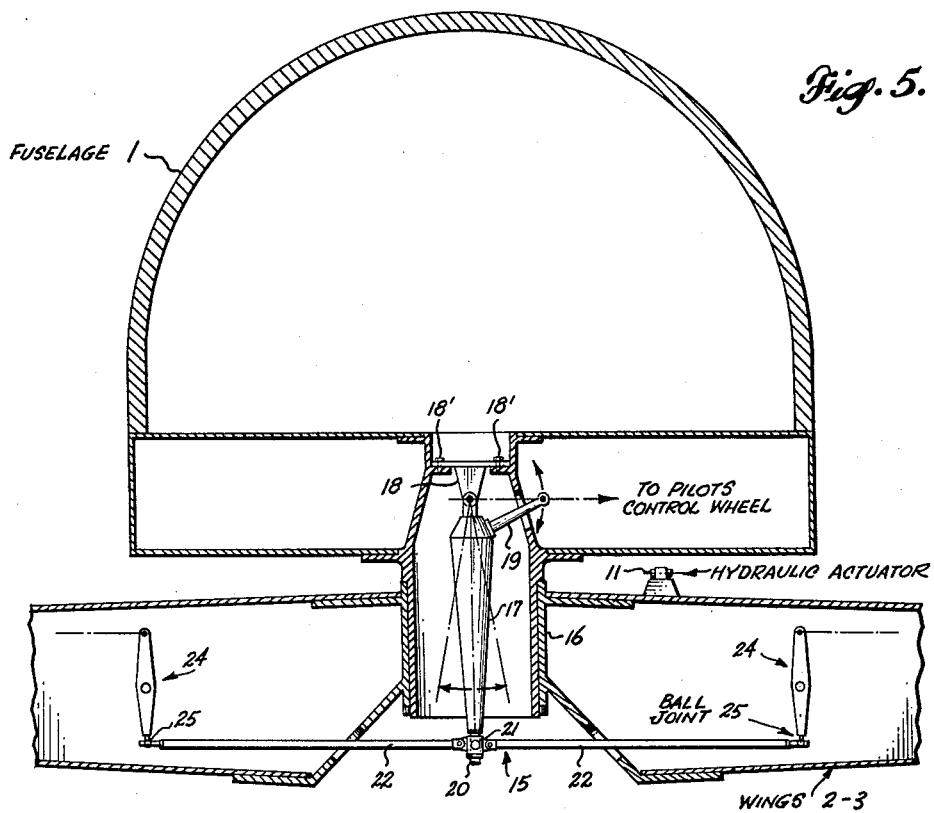
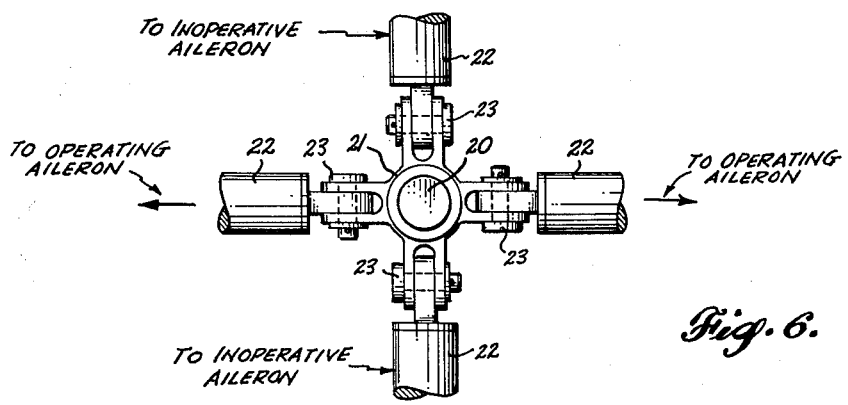
INVENTOR.
RICHARD VOGT
BY L E Carnahan
AGENT Nov. 3, 1964 R. VOGT 3,155,344
TWO POSITION VARIABLE SHAPED WING
Filed April 10, 1963 7 Sheets-Sheet 5

INVENTOR.
RICHARD VOGT
BY L.E. Carnahan
AGENT

Nov. 3, 1964    R. VOGT    3,155,344
TWO POSITION VARIABLE SHAPED WING
Filed April 10, 1963    7 Sheets-Sheet 6
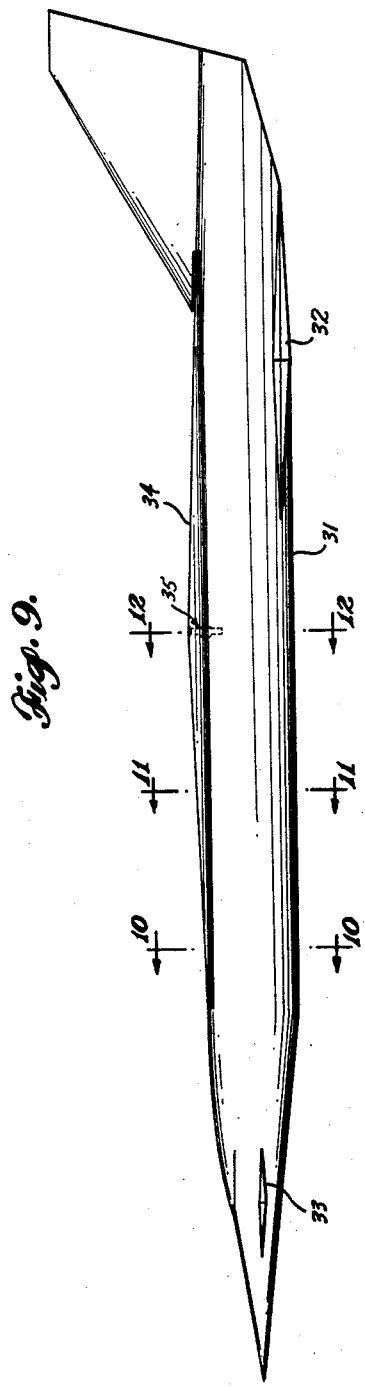
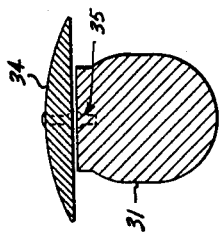
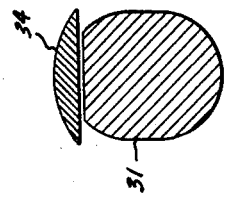
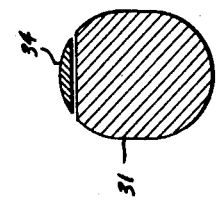
INVENTOR.
RICHARD VOGT
BY
L.E. Carnahan
AGENT

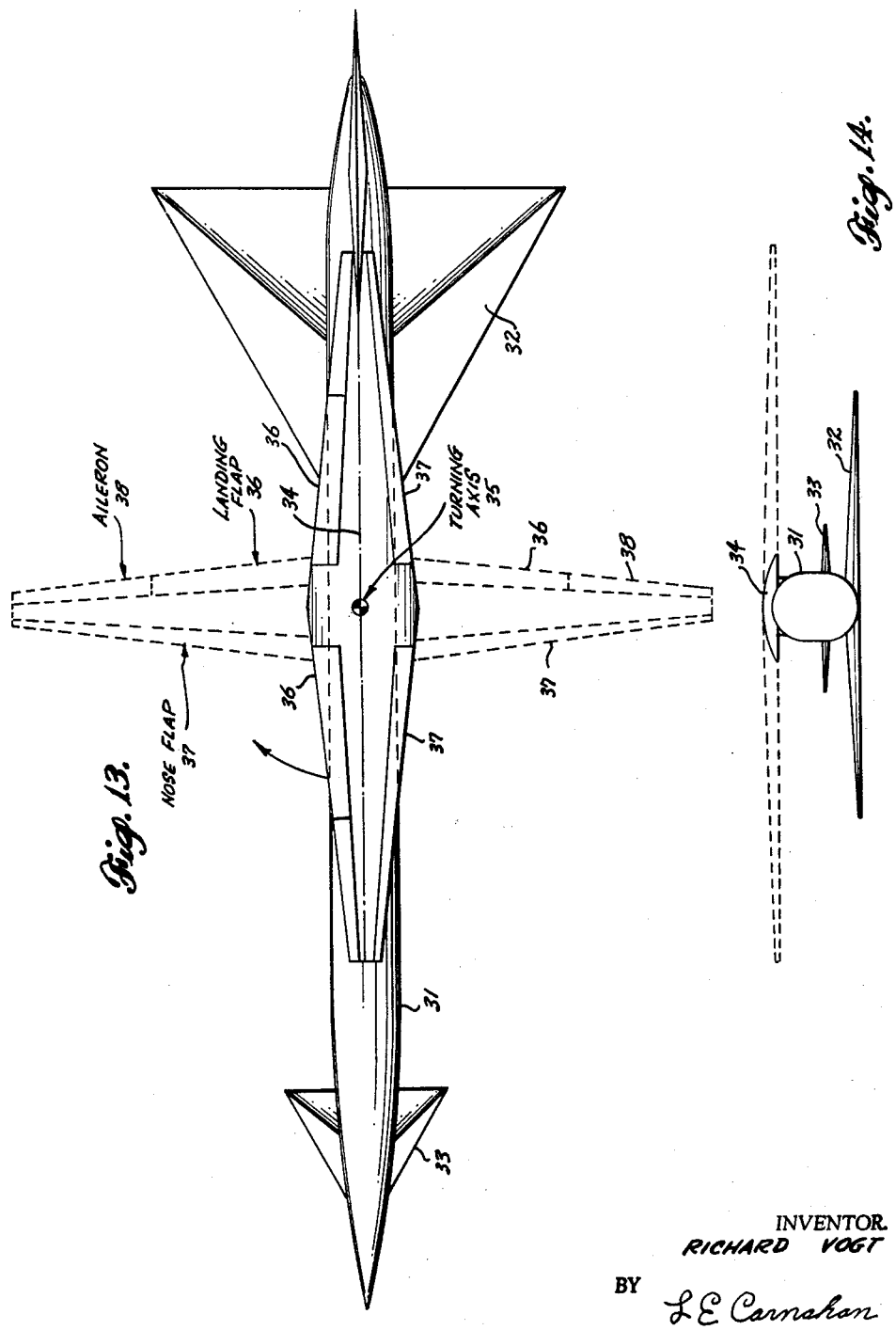

United States Patent Office 3,155,344
Patented Nov. 3, 1964

3,155,344
TWO POSITION VARIABLE SHAPED WING
Richard Vogt, Santa Barbara, Calif., assignor to The Boeing Company, Seattle, Wash., a corporation of Delaware
Filed Apr. 10, 1963, Ser. No. 271,966
9 Claims. (Cl. 244—46)

This invention relates to aircraft, and more particularly to aircraft adapted for high speed flight which at the same time is capable of being flown at lower speeds, whereby it can take off and land with as much facility as a conventional aircraft adapted to fly only at low speeds.

The best lift/drag ratio defines the most economical flight speed and the selected wing loading at the associated flight altitude.

Since the wing loading at the same time defines takeoff speed and landing speed, ever increasing velocities force the aircraft to cruise at ever increasing altitudes.

These relations become especially troublesome with aircraft of high supersonic speed, since the ever increasing altitudes produce drawbacks and difficulties. The required large wing areas which at the same time have to be extremely thin are getting very heavy. The weight for pressurization of the fuselage and for the equipment needed to climatize the cabins also increase with altitude as does the weight of the engines.

A partial way out of this dilemma has been found in the use of wings of variable geometry. Swept-back wings, or parts of them, are swung forward into a large-span position. This reduces the induced drag, increases the rate of lift with angle of attack, and to some extent, the maximum lift coefficient. These gains however are rather small and as a real drawback they are associated with a large increase of the wing weight while not allowing a sizable variation of the wing area.

This invention solves the problems set forth above on a much larger base and in an economical way.

The aircraft of the instant invention is equipped with two sets of wings, one for supersonic flight and another which is substantially hidden during supersonic flight for take-off, climb, loitering, and landing.

Therefore, it is an object of this invention to provide an aircraft adapted for flight at subsonic, sonic and supersonic speeds.

A further object of the invention is to provide an aircraft which, while being capable of flying at very high speeds, will be able to take off and land as easily as an aircraft having a maximum speed substantially lower than the velocity of sound.

A still further object of the invention is to provide an aircraft having wing structure which possess characteristics for both subsonic and supersonic speeds.

Another object of the invention is to provide an aircraft capable of subsonic and supersonic speeds which is simple in construction, lightweight, and economical, especially as compared to aircraft designs of the variable supporting surface type as heretofore proposed.

Another object of the invention is to provide an aircraft having two sets of integral wings which are rotatable for subsonic and supersonic flight conditions.

Another object of the invention is to provide an aircraft having two sets of rotatably mounted integral wings, one set for supersonic flight having a small area, one set for subsonic flight having a relatively large area.

Another object of the invention is to provide an aircraft having rotatable subsonic and supersonic wings wherein the subsonic wing area, which is hidden during supersonic flight, can have a fairly thick profile section and be equipped with large flaps, thus giving a light wing weight and a large lift coefficient.

Another object of the invention is to provide an aircraft having rotatable subsonic and supersonic wings wherein the subsonic wing can be placed properly in relation to the center of gravity of the aircraft to match with the subsonic lift center of the supersonic wing and to secure longitudinal stability.

Figure 8:
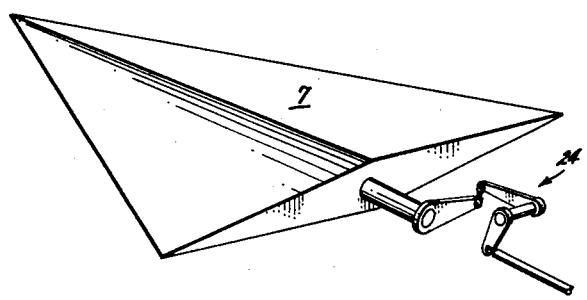

Other objects of the invention not specifically set forth above will become readily apparent from the accompanying description and drawings in which:

FIG. 1 is a front view of an aircraft incorporating one embodiment of the invention;
FIG. 2 is a side view of the FIG. 1 aircraft;
FIG. 3 is a plan view of the FIG. 1 aircraft with the wings positioned for supersonic flight;
FIG. 4 is a plan view of the FIG. 1 aircraft with the wings positioned for subsonic flight;
FIG. 5 shows the aileron control mechanism and the wing rotating mechanisms of the invention as mounted with respect to the aircraft fuselage and wings;
FIG. 6 is an enlarged view of an element of the aileron control mechanism shown in FIG. 5;
FIG. 7 is a diagrammatic view of the underside of the FIG. 4 showing the wing rotating mechanism and aileron control mechanism as mounted with respect to the wings and fuselage;
FIG. 8 is an enlarged view of the supersonic aileron and a portion of its control mechanism;
FIG. 9 is a side view of another embodiment of the invention;
FIGS. 10, 11 and 12 are cross-sectional views taken on the lines 10—10, 11—11 and 12—12 of the FIG. 9 aircraft;
FIG. 13 is a plan view of the FIG. 9 aircraft showing the wings positioned for supersonic flight in solid lines with dash lines indicating subsonic flight wing position; and
FIG. 14 is a front view of the FIG. 13 aircraft.

The aircraft as shown in FIGS. 1–4 comprises a long slender fuselage 1, a two position wing means constituting integral supersonic wing portion 2 and subsonic wing portion 3 rotatably mounted below fuselage 1 about turning axis 4, a tail section 5, and a canard type wing 6 mounted at the forward end of fuselage 1. The canard type wing 6 is utilized for balancing and control purposes because the wing portions 2 and 3 are positioned behind the center of gravity of the aircraft. Wing portions 2 and 3 are integrally formed in a diamond shape in this embodiment.

Each of supersonic wings 2 are provided with an aileron 7 at the outer end. Each of subsonic wings 3 utilize an aileron 8 at the trailing edge, a leading edge flap 9, and a landing flap 10.

Integral wings 2 and 3 are rotated 90° about turning axis 4 for subsonic and supersonic flight as indicated by the arrows in FIGS. 3 and 4.

The long slender fuselage 1 allows a large span subsonic wing 3 to be utilized. Wings 3 are tapered and have a center chord which is deeper than the width of the fuselage. The center chord of subsonic wings 3 actually constitutes supersonic wings 2 except for ailerons 7 when the aircraft is in supersonic flight condition, thereby providing supersonic lift. Since the leading edge of the exposed and tapered wing area has a very large sweep angle, the associated supersonic drag is very small.

The mechanism for rotating wings 2 and 3 is shown in FIGS. 5 and 7 wherein hydraulic actuator 11 is utilized to move the wings from the subsonic position (FIG. 4) to the supersonic position (FIG. 3). One end 12 of hydraulic actuator 11 is attached to the underside floor of fuselage 1 by attaching means (not shown) while end 13 of actuator 11 is attached to the upper surface of the wings. Arrow 14 in FIG. 7 shows the direction of movement of actuator 11 for rotating wings 2 and 3 90° from subsonic to supersonic position.

The two position wing means has two pairs of ailerons 7 and 8, only one pair being operable during subsonic and supersonic flight respectively depending on the position of the wings 2 and 3.

This is accomplished as shown in FIGS. 5–7 by placing a mechanism generally indicated at 15 inside a turning axle 16 to actuate both pairs of ailerons. Since axle 16, interconnecting the wing means and the fuselage, is subject to large forces and moments, its diameter is large enough for the installation of mechanism 15.

Mechanism 15 includes an actuating lever 17 which is pivotally mounted at the upper end on a support 18 fixed to axle 16 by bolts 18'. A control lever 19 is threaded into lever 17 and is operatively connected through a cutout in axle 16 with the pilot's control wheel as indicated by the legend in FIG. 5. The lower end of lever 17 constitutes a vertical bolt 20 which carries, free rotatable, an element 21 to which four control rods 22 are operatively connected by pins 23 (see FIG. 6). Element 21 being held on bolt 20 by any conventional means. Control rods 22 extend through cut-outs in axle 16 and are operatively connected to their respective ailerons 7 and 8 by linkage mechanism generally indicated at 24 which includes ball joints 25 to compensate for the unavoidable twist of those rods which lead to the inoperative ailerons. Element 21, control rods 22 and linkage mechanism 24 rotate with wings 2 and 3. As shown by the arrows in FIG. 5 movement of the pilot's control wheel causes lever 19 to swing in vertical direction which in turn causes actuating lever 17 to swing in a spanwise horizontal direction whereby element 21 sets in motion the pair of connector rods 22 and their associated ailerons which are in the spanwsie position without moving the other pair of rods 22 and their associated ailerons, this movement being indicated more clearly in FIG. 6. However, both sets are operating in any intermediate wing position, that is, during turning the wing from one position to the other by actuator 11. Beginning with a small displacement of a pair of ailerons when turning out from under the fuselage, the control displacement gradually increases until full actuation is accomplished when spanwise position is reached. The opposite is the case for the ailerons which move from the spanwise position towards or under the fuselage.

The underside of the wings 2 and 3 is indented to make the attachment of control rods 22 to element 21 accessible.

While the FIGS. 1–4 embodiment utilizes diamond shaped wing means, other wing configurations may be utilized.

The embodiment of the aircraft shown in FIGS. 9–14 comprises a long slender fuselage 31, a supersonic wing 32 of delta shape position behind the center of gravity of the aircraft, a canard type wing 33 for balancing and control purposes due to the position of supersonic wing 32, a subsonic wing 34 rotatably mounted on the top of fuselage 31 for 90° rotation about turning axis 35, and a tail section.

Subsonic wing 34 is provided with landing flaps 36, leading edge flaps 37, and ailerons 38.

Wing 34 is rotated from the solid line supersonic position, in the direction indicated by the arrow in FIG. 13, to the subsonic position as indicated by the dash lines in FIGS. 14 and 13.

Subsonic wing 34 is tapered with a center chord which is deeper than the width of the fuselage (see FIGS. 10–13). Therefore, in supersonic flight condition, a small part of its area is exposed and therefore provides a small amount of supersonic lift. Since the leading edge of the exposed and tapered area has a very large sweep angle, the associated supersonic drag is very small. If only a small subsonic wing area is required the whole of wing 34 can be hidden on top of fuselage 1.

The cross section of subsonic wing 34, as shown in FIGS. 10–12 is symmetrical in shape with a circular arc on the upper side while the underside is straight. This design has no harmful consequence since in exposed spanwise position the landing flaps 36 may be slightly extended during climb and while loitering, and will be in a deep down position for landing.

The pointed nose of the circular arc profile of wing 34 recommends the use of leading edge flaps 37 in order to obtain a real large maximum lift coefficient.

The 90° rotation of wing 34 from subsonic to supersonic and vice versa can be effectively accomplished by actuator mechanisms of the type described above and shown in FIG. 7 and repetition of this description is deemed unnecessary.

The aileron control mechanism for ailerons 38 differs from that described above with respect to FIGS. 1–8 in that wing 34 has no aileron movement when in the supersonic flight condition and thus ailerons 38 operates only when wing 34 is in its spanwise position.

Since wing 34 is on top of fuselage 31, the aileron control mechanism similar to that shown in FIG. 5 will function effectively, the only change being that the turning axle 16 and actuating lever 17 and associated elements are standing instead of hanging and, on its upper end, only one pair of aileron connector rods 22 are attached to element 21.

While the subsonic wing has been described and shown positioned at the top of the fuselage, it can also be positioned at the bottom as in the FIGS. 1–8 embodiment. In such case thickness and chord of the center section of the rotatable subsonic wing can be made spacious enough to retract the landing gear into this section.

In view of the foregoing, the instant invention allows a designer a broad variation from which to select the most economical configuration. For cases where extreme flight altitudes are wanted, a small amount of additional wing area needs to be provided and, in case of aircraft which have to fly supersonic at low altitudes, a small supersonic wing and a relatively large subsonic wing can be utilized.

It has thus been shown that the instant invention provides an effective and simple solution to each of the problems of the prior known supersonic aircraft.

Although particular embodiments of the invention have been illustrated and described, it will be obvious to those skilled in the art that various changes and modifications may be made without departing from the invention, and it is intended to cover in the appended claims all such changes and modifications that come within the true spirit and scope of the invention.

What I claim is:

1. In an aircraft having a fuseage, wing means mounted with respect to said fuselage and having a portion designed for subsonic lift and a portion designed for supersonic lift, said supersonic lift portion constituting the center chord of said subsonic lift portion, means for rotating said wing means from subsonic to supersonic flight position, and means for actuating control surfaces of said wing means.

2. In an aircraft having a fuselage, wing means defining two portions disposed substantially perpendicular to one another and having wing areas defining different wing loadings and adapted respectively to support the aircraft at high speeds and at relatively low speeds, said two portions of the wings intersecting along the longitudinal axis of the aircraft, one of said wing portions constituting the center chord of the other of said wing portions, means for rotating said wing portions about an axis positioned on said longitudinal axis to selectively bring a desired one of said wing portions to an aircraft supporting position.

3. In an aircraft having a fuselage, wing means having a center chord which is deeper than the width of said fuselage, said wing means having areas defining different wing loadings and adapted respectively to support the aircraft at high speeds and at relatively low speeds, said area adapted to support the aircraft at relatively high speeds constituting the center chord of the area adapted to support the aircraft at relatively low speeds, means for rotating said wing means with respect to said fuselage to selectively bring desired wing areas to an aircraft lift position, and means for actuating control surfaces of said wing means.

4. The device defined in claim 1 wherein said control surface actuating means includes means for actuating the control surfaces of the portion of the wing means designed for subsonic lift without actuation of the control surfaces of the portion of the wing means designed for supersonic lift when said subsonic lift portion is in subsonic flight position and vice versa.

5. The device defined in claim 2 wherein said wing portions are provided with control surfaces, and means for actuating the control surfaces of the wing portion in the aircraft supporting position without actuating the control surfaces of the other wing portion.

6. In an aircraft having a fuselage, a two position wing means constituting integral subsonic and supersonic wing portions, said supersonic wing portion constituting the center chord of said subsonic wing portion, a tail section, a canard type wing, means for rotating said wing means from subsonic flight position to supersonic flight position and vice versa, each said wing portions being provided with control surfaces, and means for actuating said control surfaces.

7. The apparatus defined in claim 6 where said canard type wing is mounted at the forward end of said fuselage, and said integral subsonic and supersonic wing portions define a diamond shape configuration.

8. The apparatus defined in claim 6 wherein said subsonic wing portion includes control surfaces on the leading edge thereof.

9. In an aircraft having a fuselage, a subsonic wing having a center chord deeper than the width of said fuselage and being provided with control surfaces, a supersonic wing positioned behind the center of gravity of the aircraft, a canard type wing positioned ahead of the center of gravity, a tail section, means for actuating said control surfaces, and means for rotating said subsonic wing through a 90° angle, whereby the center chord of said subsonic wing functions to provide lift during supersonic flight conditions.

References Cited in the file of this patent

UNITED STATES PATENTS

| | | |
|---|---|---|
| 2,670,910 | Hill et al. | Mar. 2, 1954 |
| 2,774,555 | Crawford et al. | Dec. 18, 1956 |
| 3,064,928 | Toll | Nov. 20, 1962 |

FOREIGN PATENTS

| | | |
|---|---|---|
| 505,188 | Italy | Dec. 16, 1954 |
| 510,430 | Italy | Jan. 21, 1955 |